United States Patent
Terry et al.

(10) Patent No.: US 9,810,156 B2
(45) Date of Patent: Nov. 7, 2017

(54) SYSTEMS AND METHODS FOR CONTROLLING MODE TRANSFERS OF A COMBUSTOR

(71) Applicant: General Electric Company, Schenectady, NY (US)

(72) Inventors: Jason Charles Terry, Greenville, SC (US); Timothy Andrew Healy, Greenville, SC (US)

(73) Assignee: General Electric Company, Schenectady, NY (US)

( * ) Notice: Subject to any disclaimer, the term of this patent is extended or adjusted under 35 U.S.C. 154(b) by 793 days.

(21) Appl. No.: 13/718,588

(22) Filed: Dec. 18, 2012

(65) Prior Publication Data

US 2014/0165581 A1    Jun. 19, 2014

(51) Int. Cl.
| | |
|---|---|
| *F02C 9/00* | (2006.01) |
| *F02C 9/28* | (2006.01) |
| *F23N 5/20* | (2006.01) |

(52) U.S. Cl.
CPC .............. *F02C 9/00* (2013.01); *F02C 9/28* (2013.01); *F23N 5/203* (2013.01); *F23N 2041/20* (2013.01)

(58) Field of Classification Search
CPC .... F01K 23/10; F02C 3/05; F02C 3/08; F02C 9/00; F02C 9/22; F02C 9/26; F02C 9/28; F02C 5/02; F02C 6/18; F02C 7/36; F23N 5/003; F23N 5/203; F23N 2041/20; F23N 5/08; F23N 2025/10; F23N 2900/05003; F23N 5/04; F05D 2270/082; F05D 2270/083; F05D 2270/0831; F05D 2270/71; F05D 2270/303; F05D 2270/44; F05D 2270/31; F05D 2270/54; F05D 2270/3011; F05D 2270/3013; F01D 17/00; F01D 17/162; F05B 2270/303; F05B 2260/90; Y02E 20/16; Y02E 20/18; Y02T 50/675; Y10T 477/40; F23R 3/26; G05B 12/041; G07C 3/00

See application file for complete search history.

(56) References Cited

U.S. PATENT DOCUMENTS

| | | | |
|---|---|---|---|
| 7,127,898 B2 | 10/2006 | Healy | |
| 7,823,388 B2 * | 11/2010 | Murakami | ................ F02C 9/28 60/39.281 |
| 7,966,802 B2 * | 6/2011 | Szepek | ................ H04B 17/345 60/39.281 |
| 2008/0243352 A1 * | 10/2008 | Healy | ..................... F01D 17/00 701/100 |

* cited by examiner

*Primary Examiner* — Steven Sutherland
(74) *Attorney, Agent, or Firm* — Eversheds Sutherland (US) LLP (57) ABSTRACT

Systems and methods for controlling mode transfers of a turbine combustor are provided. According to one embodiment, a system may include a controller to control a combustor, and a processor communicatively coupled to the controller. The processor may be configured to receive current operating conditions, target operating limits, and combustor transfer functions. The combustor transfer functions may be evaluated to estimate operating limits associated with one or more combustion modes under the current operating conditions. The estimated operating limits associated with the one or more combustor modes may be compared to the target operating limits, and, based on the comparison, at least one of the combustion modes may be selected. The combustor may then be selectively transferred to the selected combustion mode.

15 Claims, 5 Drawing Sheets

SYSTEMS AND METHODS FOR CONTROLLING MODE TRANSFERS OF A COMBUSTOR

TECHNICAL FIELD

This disclosure relates generally to turbine combustors. More particularly, the disclosure relates to systems and methods for controlling mode transfers of a combustor.

BACKGROUND

Gas turbine operations may include transferring a combustor to a particular combustion mode in order to optimize its performance. Selecting a combustion mode can be based upon some target performance parameters associated with a particular load and speed. A transferring strategy may be implemented to transfer the combustor to another combustion mode.

Conventionally, combustion mode transfers are scheduled against a single machine-level parameter and are typically determined during the design phase and hard-coded into a control system. Thus, the conventional methods for controlling combustion mode transfers do not provide for real-time optimization of combustion across various ambient conditions or target combustion parameters.

BRIEF DESCRIPTION OF THE DISCLOSURE

The present disclosure relates to systems and methods for controlling mode transfers of a combustor. According to one embodiment, a system may be provided. The system may include a controller configured to control the combustion system and a processor communicatively coupled to the controller. The processor may be configured to receive one or more current operating conditions, one or more target operating limits, and one or more combustor transfer functions. The one or more combustor transfer functions may be evaluated to estimate operating limits associated with one or more combustion modes under the one or more current operating conditions. The one or more estimated operating limits associated with the one or more combustion modes may be compared to the target operating limits and, based at least in part on the comparison, at least one combustion mode may be selected. The combustor may be then selectively transferred to the selected combustion mode.

In one embodiment, a method may be provided. The method may include receiving, by a processor, one or more current operating conditions, one or more target operating limits, and one or more combustor transfer functions. The one or more combustor transfer functions may be evaluated, by the processor, to estimate operating limits associated with one or more combustion modes under the one or more current operating conditions. The one or more estimated operating limits associated with the one or more combustion modes may be compared, by the processor, to the target operating limits and, based at least in part on the comparison, at least one of the combustion modes may be selected by the processor.

In one embodiment, another system may be provided. The system may include a gas turbine having a combustor, a controller configured to control the combustor, and a processor communicatively coupled to the controller. The processor may be configured to receive one or more current operating conditions, one or more target operating limits, and one or more combustor transfer functions. The one or more combustor transfer functions may be evaluated to estimate operating limits associated with one or more combustion modes under the one or more current operating conditions. The one or more estimated operating limits associated with the one or more combustion modes may be compared to the target operating limits and, based at least in part on the comparison, at least one combustion mode may be selected. The combustor may be then selectively transferred to the at least one selected combustion mode.

Other embodiments and aspects will become apparent from the following description taken in conjunction with the following drawings.

DETAILED DESCRIPTION

The following detailed description includes references to the accompanying drawings, which form part of the detailed description. The drawings depict illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to systems and methods for controlling mode transfers of a combustor in gas turbine engines. Industrial power generation gas turbine engines may include a compressor for compressing air that is mixed with fuel and ignited in a combustor for generating combustion gases. The combustion gases may flow to a turbine that extracts energy for driving a shaft to power the compressor and produces output power for powering an electrical generator, for example. The turbine is typically operated for extended periods of time at a relatively high base load for powering the generator to produce electrical power for a utility grid, for example.

Industrial and power generation gas turbines may have control systems with controllers that monitor and control their operation. These controllers govern the combustion system of the gas turbine, controlling various modes of operation from cold startup through base load. In addition to operating the gas turbine to maintain safe and effective base load operation while avoiding undesirable combustion dynamics, the controller needs to maintain gas turbine emissions compliant with government regulations and contractual obligations and at the same time aim to achieve efficient power output.

During operation, a gas turbine may switch between different combustion modes. Each of the combustion modes in similar speed/load situations may provide different operation performances associated with operation stability, emissions, lean blowout (LBO), dynamics, fuel economy, and the like. Transferring to a certain combustion mode with an optimal performance in a particular situation is thus preferable. Selecting a combustion mode in which to operate may be based upon a combustor response under particular operating conditions in the combustion mode.

According to various embodiments of the present disclosure, the control of combustion mode transfers may be accomplished by an automation algorithm using combustor transfer functions that provide accurate predictions of combustor responses to a wide range of turbine operating conditions. The algorithm allows reading and saving combustor transfer functions, current operation conditions of the turbine, target operating limits (such as desired emission levels at baseload and partload operation), dynamics, LBO, temperatures, and the like, and generates a set of real-time scores for each combustion mode. The scores may be used to determine the best combustion mode to use for a given set of machine operating conditions.

In certain example embodiments, each target operating limit may be associated with an individual combustor transfer function. That is, the emissions, LBO, dynamics, and so forth, may each have a transfer function model. These combustor transfer functions may be combined into an objective function that would score the relative weights of each transfer function to determine the best combustion mode in which to operate. In certain example embodiments, each mode may have a different combustor transfer function for each target operating limit depending on the complexity of the turbine system.

In certain example embodiments, operating conditions are measured constantly and the combustor transfer functions are periodically re-evaluated, and depending on the ambient operating conditions of the turbine, the controller may decide whether to transfer to another combustion mode or to stay in a current combustion mode.

In certain example embodiments, to avoid too frequent transfers between combustion modes, hysteresis may be used. The hysteresis may take into account the dynamics of ambient conditions and combustion parameters.

In one example embodiment, the combustor may include a dry low Nitrogen Oxide (NO)x (DLN) combustor. The DLN combustor is a premixed combustor designed for use with natural gas fuel as well as liquid fuel. The DLN combustion system may operate in multiple distinct modes during premixed natural gas or oil fuel operation. In the premixed mode, the first stage may thoroughly mix the fuel and air and deliver a uniform, lean, unburned fuel-air mixture to the second stage.

The load range associated with these modes varies with the degree of inlet guide vane modulation, exhaust temperature, inlet bleed heating, and, with the ambient temperature.

Gas turbine engines with DLN combustion systems may require precise control so that the turbine gas emissions are within the limits established by the turbine manufacturer, and to ensure that the gas turbine operates within certain operability boundaries (e.g., lean blowout, combustion dynamics, and other parameters).

The technical effects of certain embodiments of the disclosure may include enabling operational flexibility along various turbine operating conditions by automatically controlling combustion mode transfers. Accordingly, the ability to optimize turbine operation across multiple operating limits, rather than based on a single limit such as, for example, exhaust temperature, when using only schedule-based control systems, allows for more flexible control and improved operating efficiencies. Additionally, the system for controlling mode transfers provides for flexible, relatively simple, real-time updates or modification of operating conditions and operating limits without substantially affecting existing control settings or limit parameters.

Example embodiments of the disclosure will now be described with reference to the accompanying figures.

Figure 1:
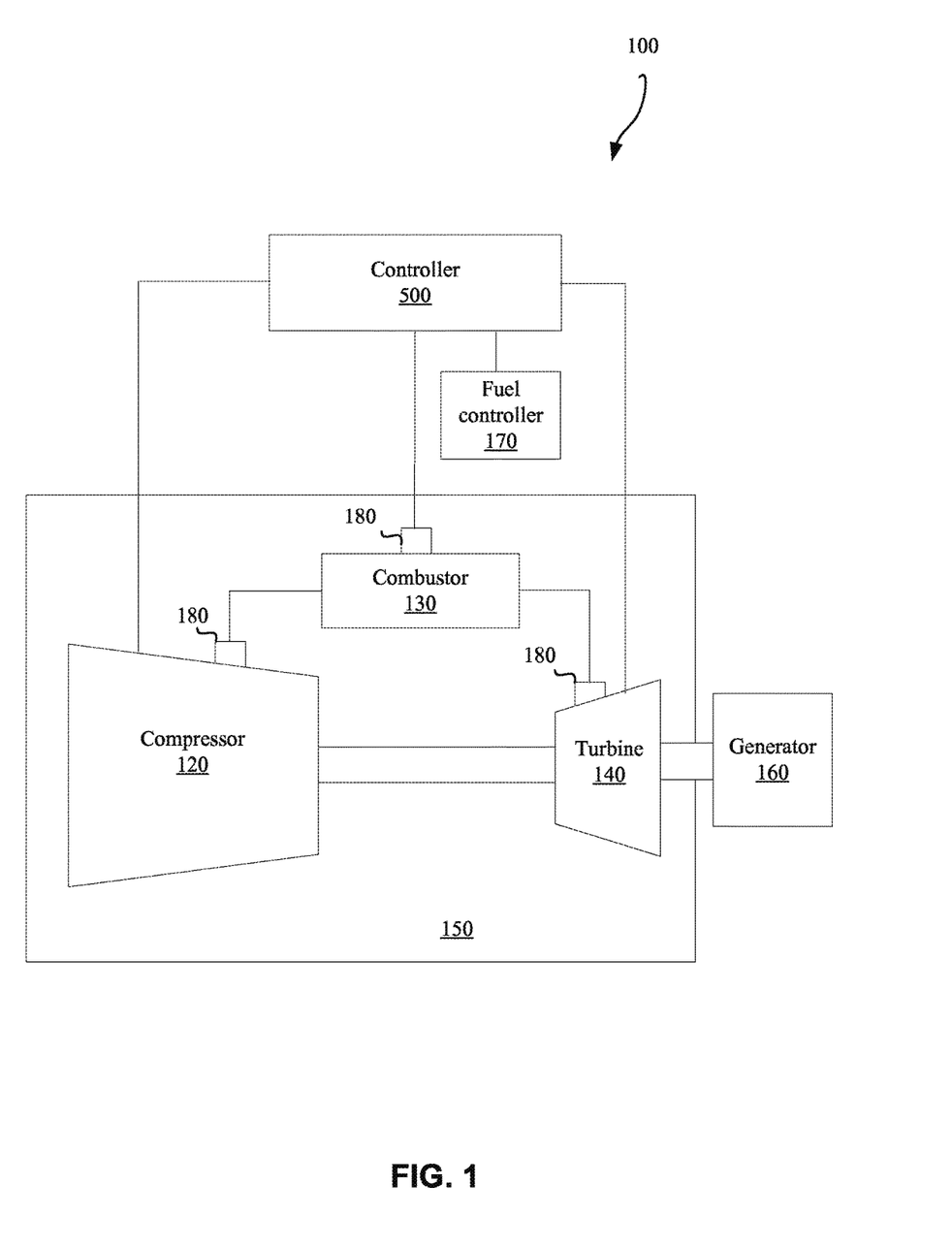
FIG. 1 depicts a simplified block diagram illustrating an example environment, in accordance with an embodiment of the disclosure.

Referring now to FIG. 1, a block diagram illustrates a system environment 100 suitable for implementing a method for controlling mode transfers of a combustor during turbine operation, in accordance with one or more example embodiments. In particular, the system environment 100 may comprise a gas turbine 150 comprising a compressor 120, a combustor 130, a turbine 140 coupled to the compressor 120, and a controller 500. The gas turbine 150 may drive a generator 160 that produces electrical power and supplies the electrical power via a breaker to an electrical grid.

The compressor 120, combustor 130, and turbine 140 may be coupled to the controller 500. The controller 500 may be configured to initiate combustion mode transfers during turbine operation.

The operation of the gas turbine 150 may be managed by the controller 500. The controller 500 may include a computer system having a processor(s) that executes programs to control the operation of the gas turbine 150 using sensor inputs and instructions from human operators. The programs executed by the controller 500 may include scheduling algorithms for regulating fuel flow to the combustor 130 and the angle of the inlet guide vanes (IGVs). The commands generated by the controller 500 may cause a fuel controller 170 associated with the gas turbine 150 to adjust, for example, valves between the fuel supply and the combustor 130 that regulate the flow and type of fuel, and may cause actuators to adjust the angle of the IGVs on the compressor 120.

The operation of the gas turbine 150 may be monitored by one or more sensors 180 detecting various conditions of the gas turbine 150, the generator 160, and the sensing parameters of the environment. For example, temperature sensors may monitor ambient temperature surrounding the gas turbine 150, compressor discharge temperature, turbine exhaust gas temperature, and other temperature measurements of the gas stream through the gas turbine 150. Pressure sensors may monitor ambient pressure, and static and dynamic pressure levels at the compressor inlet and outlet, and turbine exhaust, as well as at other locations in the gas stream. Further, humidity sensors (e.g., wet and dry bulb thermometers) may measure ambient humidity in the inlet duct of the compressor. The sensors 180 may also comprise flow sensors, speed sensors, flame detector sensors, valve position sensors, guide vane angle sensors, or the like that sense various parameters pertinent to the operation of the gas turbine 150. As used herein, "parameters" and similar terms refer to items that can be used to define the operating conditions of the gas turbine 150, such as temperatures, pressures, and flows at defined locations in the gas turbine 150 that can be used to represent a given turbine operating condition.

The controller 500 may regulate the fuel flowing from a fuel supply to the combustor 130 and the split between the fuel flowing into various nozzles and the fuel mixed with air before flowing into the combustion zone, and may select the type of fuel for the combustor 130. The fuel controller 170 may be a separate unit or may be a component of a larger controller.

The controller 500 may interact with the system for controlling mode transfers of a combustor to receive one or more current operating conditions, one or more target operating limits, and one or more combustor transfer functions; evaluate the one or more combustor transfer functions to estimate operating limits associated with one or more combustion modes under the one or more current operating conditions; compare the one or more estimated operating limits associated with the one or more combustion modes to the target operating limits; and based at least in part on the comparison, select at least one of the combustion modes; and selectively transfer the combustor to the selected combustion mode.

Figure 2:
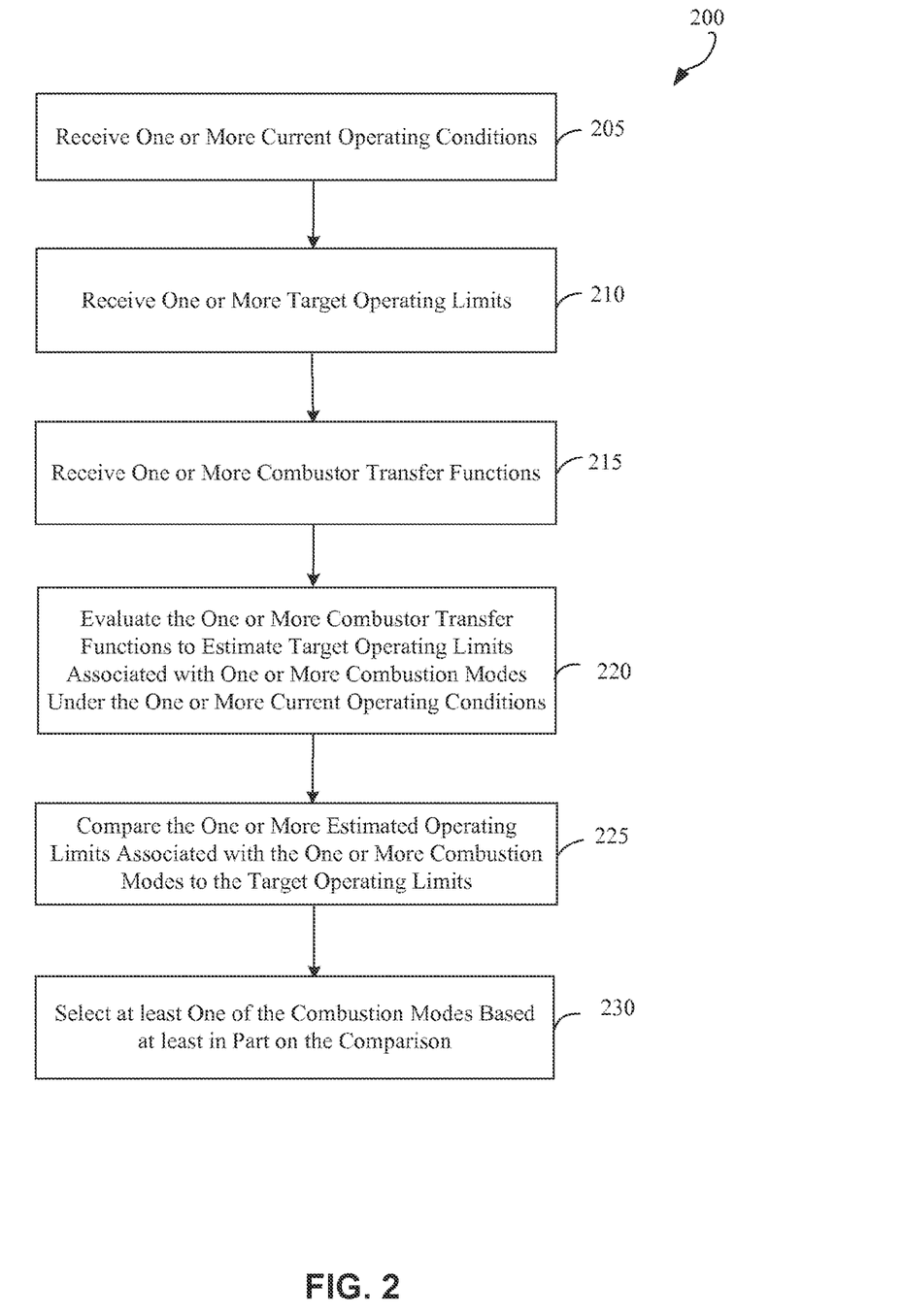
FIG. 2 depicts a process flow diagram illustrating an example method, in accordance with an embodiment of the disclosure.

FIG. 2 depicts a process flow diagram illustrating an example method 200, in accordance with an embodiment of the disclosure. The method 200 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 500, which may reside in a user device or in a server. It will be appreciated by one of ordinary skill in the art that instructions said to be executed by the controller 500 may, in fact, be retrieved and executed by one or more processors. The controller 500 may also include memory cards, servers, and/or computer discs. Although the controller 500 may be configured to perform one or more steps described herein, other control units may be utilized while still falling within the scope of various embodiments.

As shown in FIG. 2, the method 200 may commence in operation 205 with receiving one or more current operating conditions of the gas turbine. The one or more current operating conditions may include, but are not limited to, ambient conditions, loading rate, angle of the inlet guide vanes, amount of fuel flow, turbine rotational speed, compressor inlet pressure and temperature, compressor exit pressure and temperature, turbine exhaust temperature, generator power output, and the like. The one or more current operating conditions may comprise one or more of a real-time calculated machine condition and a measured machine operating condition. Some operating conditions are measured (i.e., are sensed and are directly known). Other operating conditions are estimated by a model and are indirectly known. Operating conditions that are modeled may also be referred to as surrogate operating conditions. Modeled operating conditions may include, but are not limited to, compressor airflow, combustor fuel/air ratio, firing temperature (turbine inlet), combustor flame temperature, fuel system pressure ratios, and acoustic characteristics.

The operating conditions of the gas turbine may be measured and calculated in real-time by several sensors detecting various conditions of the turbine, compressor, combustor, and environment. For example, temperature sensors may monitor compressor discharge temperature, turbine exhaust gas temperature, and other temperature measurements of the gas stream through the gas turbine. Pressure sensors may monitor static and dynamic pressure levels at the compressor inlet and outlet, and turbine exhaust, as well as at other locations in the gas stream. The sensors may also comprise flow sensors, speed sensors, flame detector sensors, valve position sensors, guide vane angle sensors, or the like that sense various conditions pertinent to the operation of the gas turbine.

In operation 210, the controller may receive one or more target operating limits. The one or more target operating limits may comprise one or more of an emission, combustion instability, lean blowout boundary, combustor dynamics, fuel supply pressure, temperature, service life, bottoming cycle specifications, and the like. For example, the operating limits may relate to NOx and Carbon Oxide (CO) emissions in the turbine exhaust to be maintained within certain predefined limits or the combustor firing temperature to be within predefined temperature limits. The target operating limits may represent one or more operational boundaries in the physical space of the turbine, at or near where it is desirable for the turbine to operate in order to achieve operational efficiencies and desired performance. The target operating limits may be determined using one or both of a historic approach, based on historic and bench test-type data, or a lumped-parameter approach, based on a combined physics and empirical approach. The target operating limits may use as inputs the operating conditions directly measured from the turbine, or surrogate operating conditions as described above.

In operation 215, the controller may receive one or more combustor transfer functions. The one or more combustor transfer functions may comprise an objective function providing a real-time score of a combustion mode based on the one or more estimated operating limits associated with the combustion mode. The one or more transfer functions may be stored in a memory of the controller within the turbine control system. The transfer functions may be used to force the turbine to operate within certain limits, usually to avoid worst-case scenarios. There may be a separate combustor transfer function for each of the operating limits of the turbine. For example, there may be a combustor transfer function associated with emissions, LBO, dynamics, temperature, supply pressure, and the like. The transfer function may comprise an objective function, which uses current operating parameters of the gas turbine as inputs.

In operation 220, the controller may evaluate the one or more combustor transfer functions to estimate target operating limits associated with one or more combustion modes under the one or more current operating conditions. In accordance with one embodiment, the one or more combustor transfer functions may be combined into an objective function that may provide a real-time score for the relative weighting of each combustion mode to determine which combustion mode is optimal for a given set of operating conditions. The score may be based on the one or more estimated operating limits associated with the combustion mode.

In operation 225, the controller may compare the one or more estimated operating limits associated with the one or more combustion modes to the target operating limits, and at operation 230, the controller may select at least one of the combustion modes based at least in part on the comparison. In accordance with one embodiment, the selection of the combustion mode comprises comparing the one or more estimated operating limits associated with the one or more combustion modes with the estimated operating limits associated with the current combustion mode. The selected combustion mode is the mode that will provide a desirable combustor response for a given set of operating conditions (i.e., will have the operating limits most similar to the target operating limits).

Figure 3:
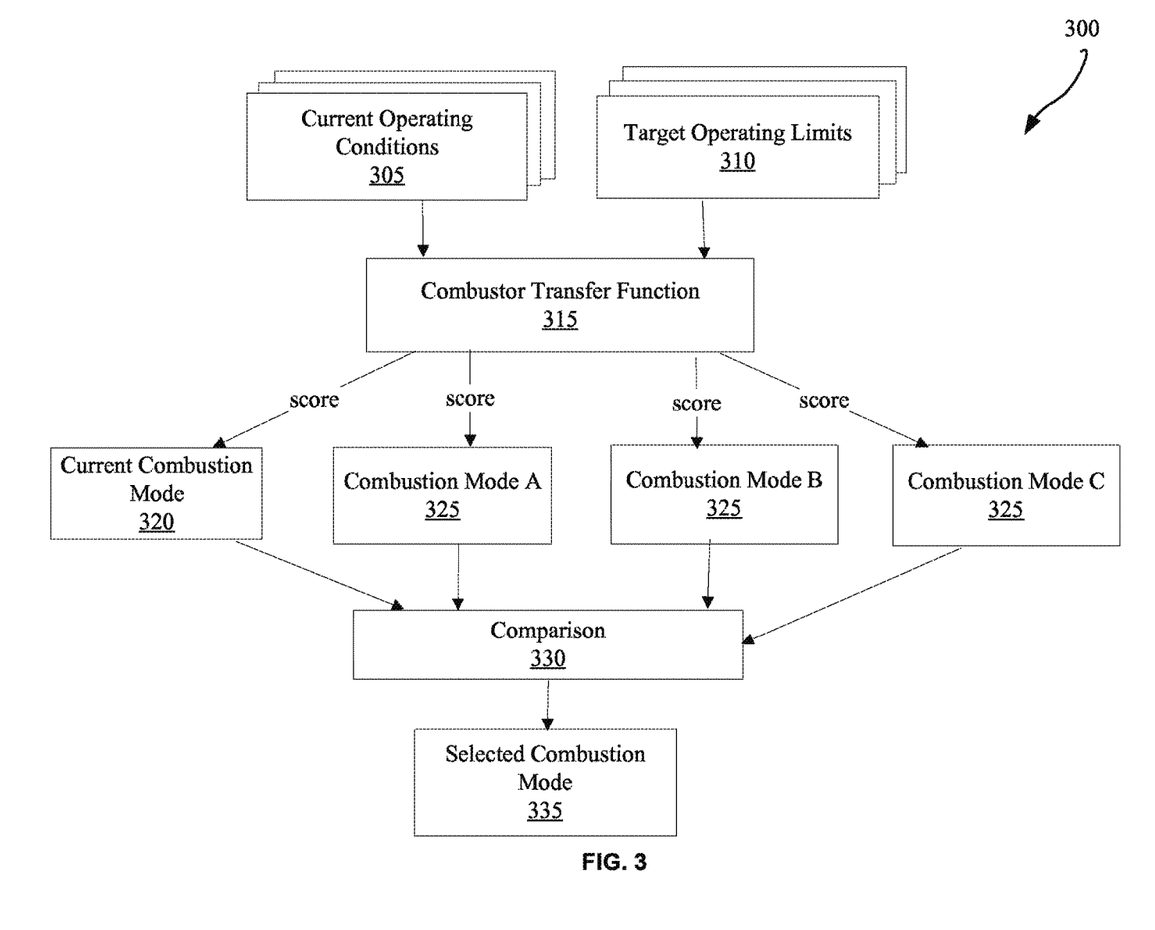
FIG. 3 depicts a process block diagram illustrating selection of a combustion mode, in accordance with an embodiment of the disclosure.

FIG. 3 depicts a process block diagram 300 illustrating the selection of a combustion mode using a combustor transfer function, in accordance with an embodiment of the disclosure. The combustor transfer function 315 may be evaluated based on the one or more current operating conditions 305 of the gas turbine and the one or more target operating limits 310. The one or more current operating conditions 305 may comprise one or more of a loading rate and an ambient temperature, which are calculated and measured in real-time by means of various sensors located in different parts of the turbine system. The one or more target operating limits 310, which may define the preferred speed and load operating ranges to delineate operation in the combustion modes, may be precalibrated and stored in the control module or set by human operators any time during turbine operation. The current operating conditions 305 and the target operating limits 310 may include the inputs of the combustor transfer function 315. In certain example embodiments, the combustor transfer function 315 may include an objective function, which is real-time calculated to provide a scoring system for possible combustion modes operability under the current operating conditions 305. The combustor transfer function 315 may score, based on the current operating conditions 305, the operating limits of the current combustion mode 320. Thereafter, the combustor transfer function 315 may estimate what the operating limits would be in other combustion modes (A, B, C) 325 under the same current operating conditions 305 and scores each combustion mode accordingly. The estimated operating limits of each combustion mode may then be compared to the target operating limits 310, and, based on the comparison 330, one of the combustion modes with the best score may be selected at operation 335.

Figure 4:
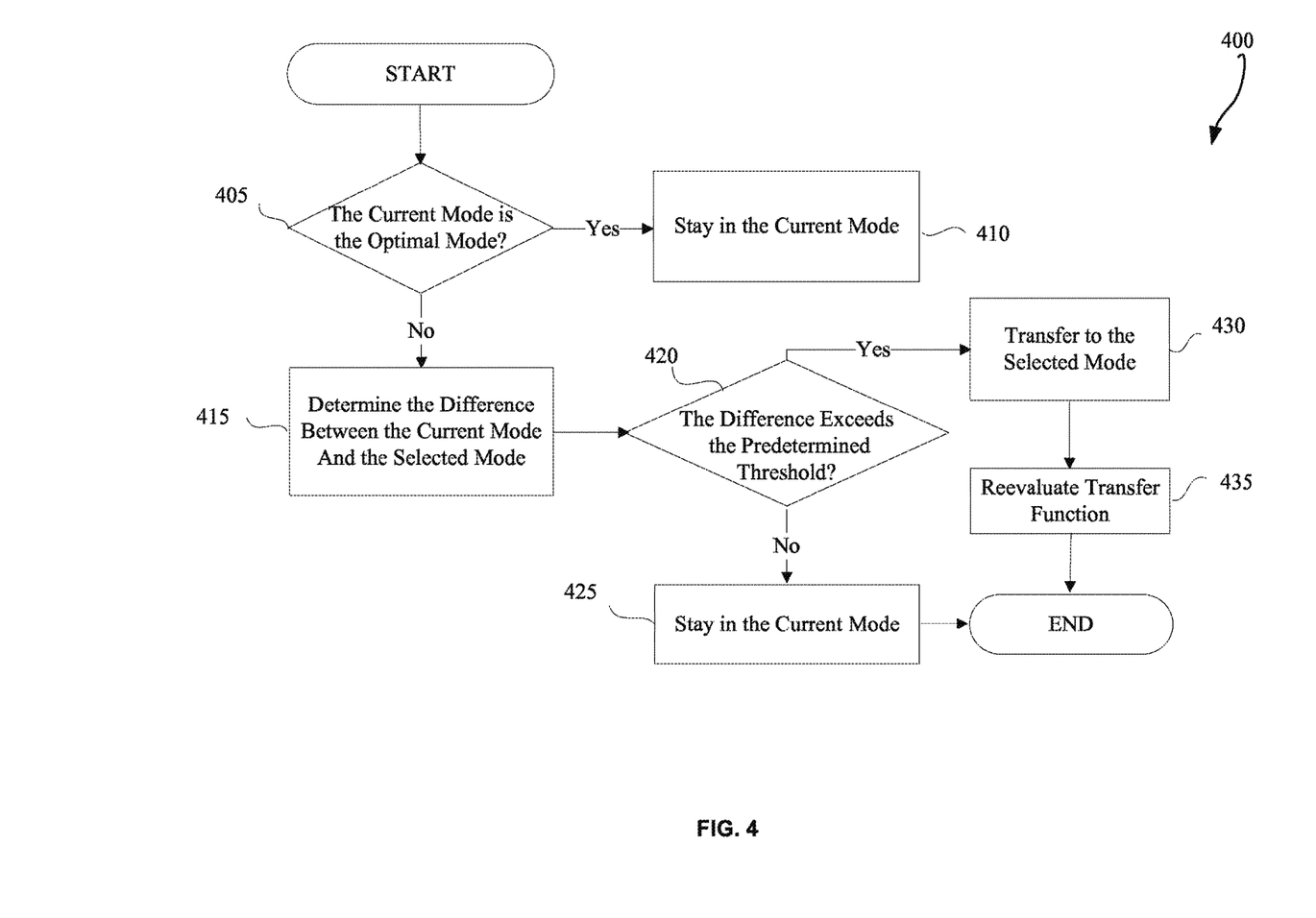
FIG. 4 depicts a process block diagram illustrating a combustion mode transferring operation, in accordance with an embodiment of the disclosure.

FIG. 4 depicts a process flow diagram illustrating combustion mode transferring operation 400. In certain example embodiments, the controller may selectively transfer the combustor to at least one of the combustion modes. In accordance with one embodiment, in operation 405, the controller may determine whether the current combustion mode is the optimal mode that will provide an improved combustor response under the current operating conditions of the turbine. If this is the case, the controller may decide to leave the combustor in the current combustion mode, in operation 410. In accordance with one embodiment, the controller may determine that at least one other combustion mode, other than the current combustion mode, will provide an improved combustor response under the current operating conditions. In this case, the controller may then determine, in operation 415, the difference between the current combustion mode and the optimal combustion mode. Specifically, in operation 420, the controller may determine whether the difference between the optimal combustion mode and the current combustion mode exceeds one or more predetermined threshold values.

Based at least in part on the determination, the controller may transfer the combustor to the selected combustion mode in operation 430 or stay in the current combustion mode in operation 425. That is, when it is determined that the difference exceeds the predetermined threshold value, the controller may transfer to at least one of the combustion modes that may provide an improved combustion response in comparison to the current combustion mode. The transfer may be initiated either by operator action or automatic turbine control. After transferring to the selected combustion mode, the controller may reevaluate, in operation 435, the one or more combustor transfer functions under the one or more current operating conditions to determine the combustor response to the combustion mode transfer.

In certain example embodiments, the controller may make an assessment of the combustor efficiency in the previous combustion mode and the combustor efficiency in the selected combustion mode based on the combustor responses measured and calculated during the operation in both combustion modes.

In certain example embodiments, the combustor transfer functions may be periodically reevaluated to provide a real-time score for combustor operability to determine at least one combustion mode that will provide a better combustion response under a current set of turbine operating conditions.

In certain example embodiments, the controller, upon controlling engine operation in one of the combustion modes, may employ hysteresis to prevent an unnecessary transfer when the engine operation is near one of the threshold values. Thus, although a preferred combustion mode may be identified, the controller may delay or completely ignore a command to transfer out of the current combustion mode to another combustion mode, as a result of the hysteresis. Hysteresis values may define the boundaries for transferring between the combustion modes and may be predefined and stored in the memory.

Figure 5:
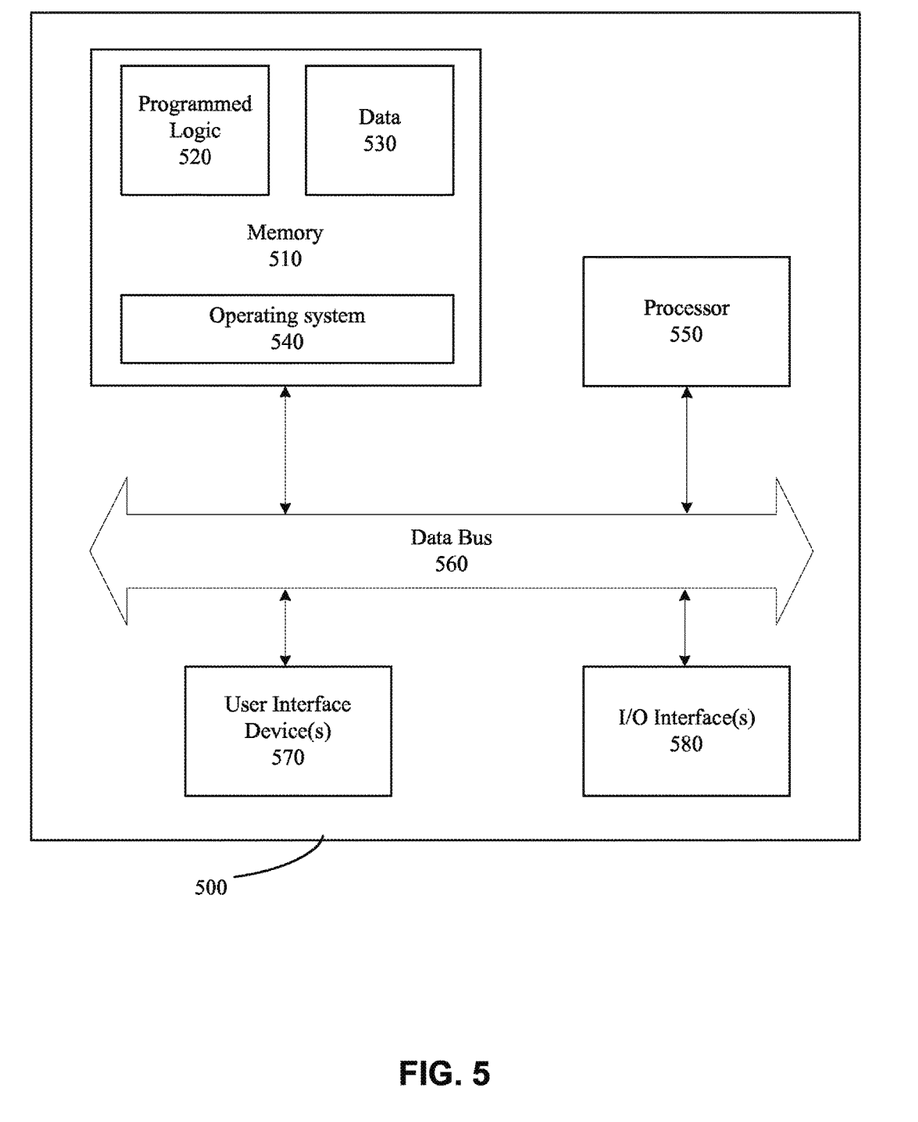
FIG. 5 is a block diagram illustrating a controller for controlling a turbine, in accordance with an embodiment of the disclosure.

FIG. 5 depicts a block diagram illustrating a controller 500 for controlling a gas turbine, in accordance with an embodiment of the disclosure. More specifically, the elements of the controller 500 may be used to control combustion mode transfers during turbine operation. The controller 500 may include a memory 510 that stores programmed logic 520 (e.g., software) and may store data, such as turbine current operating conditions, target operating limits, combustor transfer functions, and the like. The memory 510 also may include an operating system 540. A processor 550 may utilize the operating system 540 to execute the programmed logic 520, and in doing so, also may utilize the data 530. A data bus 560 may provide communication between the memory 510 and the processor 550. Users may interface with the controller 500 via at least one user interface device 570 such as a keyboard, mouse, control panel, or any other devices capable of communicating data to and from the controller 500. The controller 500 may be in communication with the gas turbine online while operating, as well as in communication with the gas turbine offline while not operating, via an Input/Output (I/O) Interface 580. More specifically, one or more of the controllers 500 may carry out the execution of the model-based controller, such as, but not limited to, receiving one or more current operating conditions; receiving one or more target operating limits; receiving one or more combustor transfer functions; evaluating the one or more combustor transfer functions in order to estimate operating limits associated with one or more combustion modes under the one or more current operating conditions; comparing the one or more estimated operating limits associated with the one or more combustion modes to the target operating limits; and based at least in part on the comparison, selecting at least one of the combustion modes. Additionally, it should be appreciated that other external devices or multiple other gas turbines may be in communication with the controller 500 via the I/O Interface 580. In the illustrated embodiment, the controller 500 may be located remotely with respect to the gas turbine; however, it may be co-located or even integrated with the gas turbine. Further, the controller 500 and the programmed logic 520 implemented thereby may include software, hardware, firmware, or any combination thereof. It should also be appreciated that multiple controllers 500 may be used, whereby different features described herein may be executed on one or more different controllers 500.

Accordingly, embodiments described herein allow controlling mode transfers of turbine combustors based on specific parameters of turbine operation, thereby resulting in a better balance of combustor response while respecting the emissions, combustion instability, and lean blowout boundaries. Real-time controlling of combustion mode transfers during turbine operation may have the technical effect of allowing for operating the turbine at greater efficiencies and improved power generation levels.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based, or programmable consumer electronics, mini-computers, mainframe computers, and so forth.

Application programs that are components of the systems and methods described herein may include routines, programs, components, data structures, and the like that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for controlling mode transfers of a combustor, the method comprising:

receiving, by a processor, one or more current operating conditions associated with a current combustion mode;

receiving, by the processor, one or more target operating limits;

receiving, by the processor, one or more combustor transfer functions;

evaluating, by the processor, the one or more combustor transfer functions to estimate one or more operating limits associated with the current combustion mode and one or more operating limits associated with a plurality of combustion modes under the one or more current operating conditions to obtain one or more estimated operating limits associated with the current combustion mode and one or more estimated operating limits associated with the plurality of combustion modes, wherein the current combustion mode is not included in the plurality of combustion modes;

comparing, by the processor, the one or more estimated operating limits associated with the current combustion mode and the one or more estimated operating limits associated with the plurality of combustion modes to the one or more target operating limits to determine similarity of the one or more estimated operating limits associated with the current combustion mode and the one or more estimated operating limits associated with the plurality of combustion modes to the one or more target operating limits;

based on the comparing, scoring the current combustion mode and each of the plurality of combustion modes to determine a combustion mode with a desired performance for the one or more current operating conditions, wherein the combustion mode with the desired performance has a highest similarity of one or more estimated operating limits associated with the combustion mode with the desired performance to the one or more target operating limits;

based at least in part on the scoring, selecting, by the processor, from the current combustion mode and the plurality of combustion modes, the combustion mode with the desired performance for the one or more current operating conditions;

determining that the combustion mode with the desired performance selected from the current combustion mode and the plurality of combustion modes includes one of the plurality of combustion modes;

based on the determining that the combustion mode with the desired performance includes one of the plurality of combustion modes, determining whether one or more differences between the one or more estimated operating limits associated with the combustion mode with the desired performance and the one or more estimated operating limits associated with the current combustion mode exceed one or more predetermined threshold values; and when the one or more differences exceed the one or more predetermined threshold values, transferring the combustor to the combustion mode with the desired performance.

2. The method of claim 1, wherein the combustor comprises a Dry Low Nitrogen Oxide (DLN) combustor.

3. The method of claim 1, wherein the one or more current operating conditions comprise one or more of a loading rate and an ambient temperature.

4. The method of claim 1, wherein the one or more target operating limits comprise one or more of an emission, a combustion instability, a lean blowout boundary, combustor dynamics, a fuel supply pressure, and a temperature.

5. The method of claim 1, wherein the one or more current operating conditions comprise one or more of a real-time calculated machine condition and a measured machine operating condition.

6. The method of claim 1, wherein the one or more combustor transfer functions comprise an objective function providing a real-time score of a combustion mode based on the one or more estimated operating limits associated with the combustion mode.

7. The method of claim 6, further comprising reevaluating, by the processor, the one or more combustor transfer functions under the one or more current operating conditions.

8. A system for controlling mode transfers of a combustor, the system comprising:
a controller configured to control the combustor; and
a processor communicatively coupled to the controller and configured to:
receive one or more current operating conditions associated with a current combustion mode;
receive one or more target operating limits;
receive one or more combustor transfer functions;
evaluate the one or more combustor transfer functions to estimate one or more operating limits associated with the current combustion mode and one or more operating limits associated with a plurality of combustion modes under the one or more current operating conditions to obtain one or more estimated operating limits associated with the current combustion mode and one or more estimated operating limits associated with the plurality of combustion modes, wherein the current combustion mode is not included in the plurality of combustion modes;
compare the one or more estimated operating limits associated with the current combustion mode and the one or more estimated operating limits associated with the plurality of combustion modes to the one or more target operating limits to determine similarity of the one or more estimated operating limits associated with the current combustion mode and the one or more estimated operating limits associated with the plurality of combustion modes to the one or more target operating limits;
score the current combustion mode and each of the plurality of combustion modes to determine a combustion mode with a desired performance for the one or more current operating conditions, wherein the combustion mode with the desired performance has a highest similarity of one or more estimated operating limits associated with the combustion mode with the desired performance to the one or more target operating limits;
select, from the current combustion mode and the plurality of combustion modes, the combustion mode with the desired performance for the one or more current operating conditions;
determine that the combustion mode with the desired performance selected from the current combustion mode and the plurality of combustion modes includes one of the plurality of combustion modes;
determine whether one or more differences between the one or more estimated operating limits associated with the combustion mode with the desired performance and the one or more estimated operating limits associated with the current combustion mode exceed one or more predetermined threshold values; and
when the one or more differences exceed the one or more predetermined threshold values, transfer the combustor to the combustion mode with the desired performance.

9. The system of claim 8, wherein the combustor comprises a Dry Low Nitrogen Oxide (DLN) combustor.

10. The system of claim 8, wherein the one or more current operating conditions comprise one or more of a loading rate and an ambient temperature.

11. The system of claim 8, wherein the one or more operating limits comprise one or more of an emission, a combustion instability, a lean blowout boundary, combustor dynamics, a fuel supply pressure, and a temperature.

12. The system of claim 8, wherein the one or more operating conditions comprise one or more of a real-time calculated machine condition and a measured machine operating condition.

13. The system of claim 8, wherein the one or more combustor transfer functions comprise an objective function providing a real-time score of a combustion mode based on the one or more estimated operating limits associated with the combustion mode.

14. The system of claim 13, wherein the processor is further configured to reevaluate the one or more combustor transfer functions under the one or more current operating conditions.

15. A system for controlling mode transfers of a combustor, the system comprising:
a gas turbine having a combustor;
a controller configured to control the combustor; and
a processor communicatively coupled to the controller and configured to:
receive one or more current operating conditions associated with a current combustion mode;
receive one or more target operating limits;
receive one or more combustor transfer functions;
evaluate the one or more combustor transfer functions to estimate one or more operating limits associated with the current combustion mode and one or more operating limits associated with a plurality of combustion modes under the one or more current operating conditions to obtain one or more estimated operating limits associated with the current combustion mode and one or more estimated operating limits associated with the plurality of combustion modes, wherein the current combustion mode is not included in the plurality of combustion modes;
compare the one or more estimated operating limits associated with the current combustion mode and the one or more estimated operating limits associated with the plurality of combustion modes to the one or more target operating limits to determine similarity of the one or more estimated operating limits associated with the current combustion mode and the one or more estimated operating limits associated with the plurality of combustion modes to the one or more target operating limits;

based on the comparing, score the current combustion mode and each of the plurality of combustion modes to determine a combustion mode with a desired performance for the one or more current operating conditions, wherein the combustion mode with the desired performance has a highest similarity of one or more estimated operating limits associated with the combustion mode with the desired performance to the one or more target operating limits;

based at least in part on the scoring, select, from the current combustion mode and the plurality of combustion modes, the combustion mode with the desired performance for the one or more current operating conditions;

determine that the combustion mode with the desired performance selected from the current combustion mode and the plurality of combustion modes includes one of the plurality of combustion modes;

determine whether one or more differences between the one or more estimated operating limits associated with the combustion mode with the desired performance and the one or more estimated operating limits associated with the current combustion mode exceed one or more predetermined threshold values; and when the one or more differences exceed the one or more predetermined threshold values, transfer the combustor to the combustion mode with the desired performance.

* * * * *